UNITED STATES PATENT OFFICE.

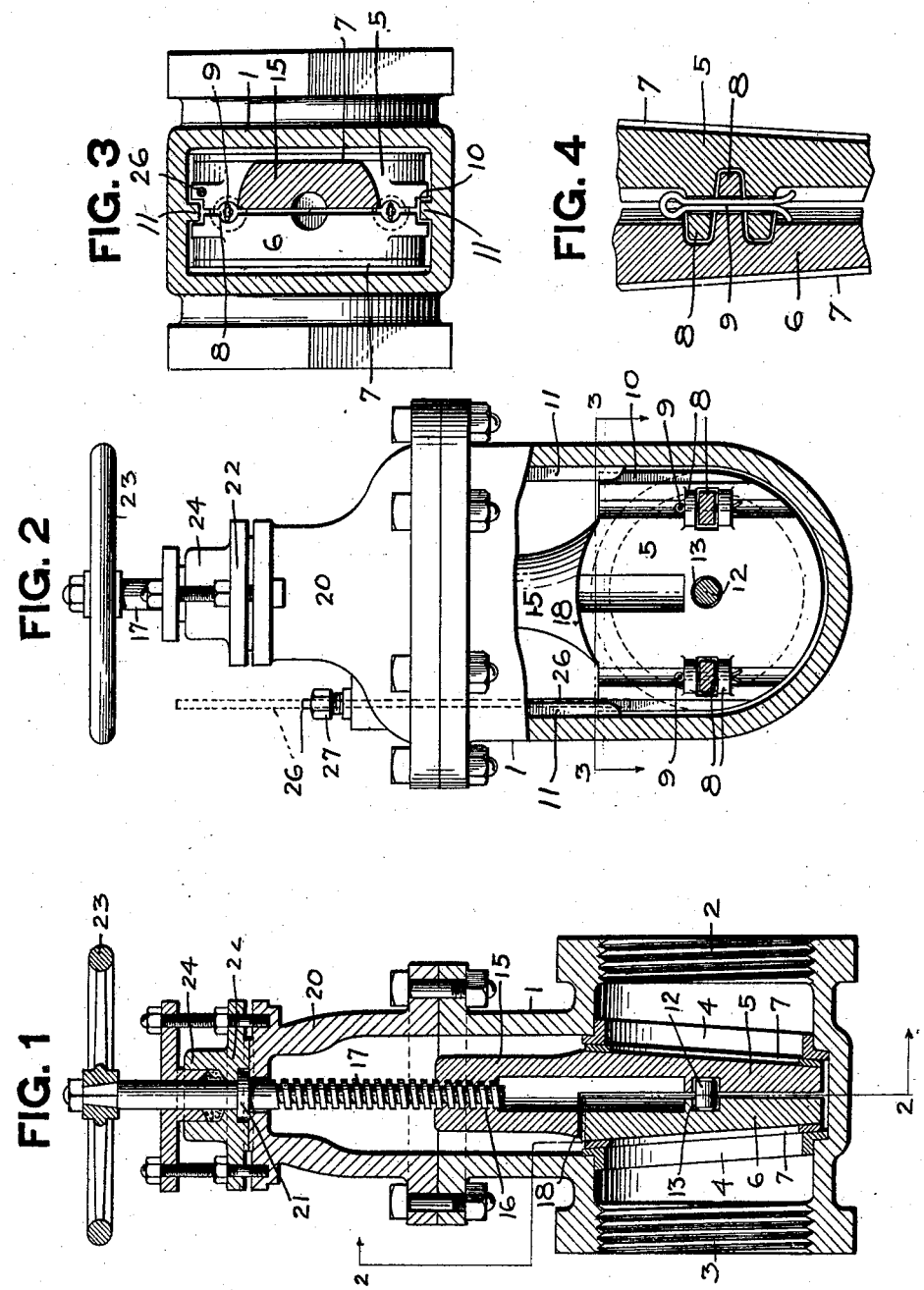

LEWIS D. CASTLE, OF BARBERTON, OHIO, ASSIGNOR TO PITTSBURGH VALVE AND FITTINGS COMPANY, OF PITTSBURG, PENNSYLVANIA, A CORPORATION OF NEW JERSEY.

GATE-VALVE.

No. 861,708.  Specification of Letters Patent.  Patented July 30, 1907.

Application filed September 22, 1906. Serial No. 279,682.

*To all whom it may concern:*

Be it known that I, LEWIS D. CASTLE, a resident of Barberton, in the county of Summit and State of Ohio, have invented a new and useful Improvement in Gate-Valves; and I do hereby declare the following to be a full, clear, and exact description thereof.

My invention relates to straight-way or gate valves, and the object is to provide a valve of this character having a shorter body or casing than valves heretofore constructed, provided with means for preventing the valve disks from scraping on the seats while being opened and closed, improved means for forcing the valve disks against their seats with an equal pressure at all points, as well as other improvements which will be hereinafter described and claimed.

In most gate valves heretofore used the actuating screws have been so arranged as to project down between the valve disks. This has necessitated a nut or other means for connecting the screw to the disks, as well as compelling the disks to be spaced apart a sufficient distance to enable the screw to pass between the same. As a consequence the valve body had to be quite long, thus adding materially to the weight of the valve as a whole. My improved valve is so constructed as to dispense with the use of a nut or other means for connecting the disks and the screw and has the parts so arranged that the disks can be placed very close together, thus shortening up the valve body and materially reducing its weight and enabling several such valves to be placed close together.

Gate valves having non-traversing spindles have always been open to the objection that it cannot be told except by actual trial, and often not even in that case, whether the valve is open or closed. A variety of devices have been used for indicating the position of the valve, but generally these have been complicated and expensive. My valve is provided with a simple and inexpensive indicating device.

Other improvements will be hereinafter described and claimed.

In the accompanying drawing Figure 1 is a longitudinal section through my improved valve and its casing; Fig. 2 is a transverse section on the line 2—2 Fig. 1; Fig. 3 is a horizontal section on the line 3—3 Fig. 2; and Fig. 4 is a detail section of the connecting hinge of the valve disks.

The valve casing or body 1 may be of any suitable shape and construction, and is provided with the inlet and outlet ports 2 and 3. It is also provided with the valve seats 4 which preferably are brass rings secured in the body in any suitable way, although said seats may if preferred be formed integral with the body. These valve seats are preferably inclined, as shown, so as to form a wedge shaped chamber therebetween. In this chamber is located the valve, the latter being composed of two disks 5 and 6 having on their outer faces brass or other suitable rings 7 adapted to contact with the valve seats 4. These valve disks are secured together in such a manner that they cannot fall apart but nevertheless move freely with reference to each other so as to adjust themselves to their seats. Various means for so connecting them may be employed, the drawings showing the disks provided with perforated lugs 8 for receiving cotter pins 9. The latter fit sufficiently loosely in the lugs so as to permit the disks to adjust themselves to their seats.

In order to prevent the disks from dragging and scraping on the valve seats when being opened and closed they are suitably guided in the casing, such as by providing spaces 10 between their side edges and forming on the inside of the valve casing or body guide ribs 11 which enter these spaces. In order that these disks may bear uniformly against their seats for their entire periphery I provide a suitable bearing or spacing piece 12 located centrally of said disks, so that the latter can rock in all directions on said bearing piece. This bearing piece may, if desired, be integral with one of the disks, but preferably it will be a separate piece seated in suitable sockets 13 formed in said disks and having its ends slightly rounded, as shown, so as to permit the disks to rock freely in all directions. By reason of this centrally located bearing or spacing piece the operating screw cannot pass down through the valve. Furthermore, in order to make the valve body as short as possible I place these valve disks very close together, so that even if this centrally located bearing piece were not used there would not be sufficient space between the disks to permit the screw to pass through the same. Accordingly, one of said disks is provided with an upwardly extending sleeve 15 which is threaded internally as at 16 for receiving the actuating screw 17. This sleeve is provided with a shoulder 18 which bears against the top of the other disk, so that when the one disk is forced downwardly it, by means of this shoulder, also forces the other disk downwardly.

The screw 17 passes up through the bonnet 20 which is secured to the upper side of the valve body, and is provided with an annular collar or shoulder 21 which is located between the upper flange of the bonnet and a cap 22 secured to said body. This collar holds the screw against upward and downward movement so that its rotation raises and lowers the valve in the well understood manner. The screw is provided at its upper end with a suitable hand-wheel or the like 23, and the usual stuffing box 24 is also provided.

Since the screw 17 does not move up and down when actuating the valve it is impossible to tell by the screw whether the valve is open or closed. To indicate the position of the valve I provide a rod or spindle 26, which may be connected to any traversing part of the valve and extends out through a stuffing box 27 located in any suitable place. As shown, this rod is attached to the edge of the disk 5; but it is obvious that it may be connected to any other portion or piece of the gate valve disk. This rod projects through the stuffing box 27 to the outside and when the disk is raised or lowered this rod has a corresponding movement parallel to the axis of the screw 17. When this rod projects above the stuffing box 27 a distance equal to the diameter of the valve disk it indicates that the valve is open, and when it is withdrawn into the body of the valve it indicates that the valve is closed. The addition of this rod and stuffing box 27 adds very little to the cost of the valve and said rod at all times indicates the position of the valve disk.
The valve described is simple of construction and efficient in operation. The two disks are very close together, so that the valve body is very short and correspondingly light. The disks are held together by means of the hinged joints 8, 9, so that they cannot fall apart and are guided by means of the ribs 11 so that they do not drag or scrape on their seats when being raised and lowered. The centrally disposed bearing or spacing piece 12 permits said disks to rock in all directions, so that when the valve is closed the disks bear against their seats with uniform pressure around their entire peripheries.

What I claim is:

1. In a gate valve, the combination of a body or casing provided with oppositely disposed inclined seats, a valve comprising a pair of disks coöperating with said seats and having a centrally disposed rocking bearing, means for connecting said disks together but permitting relative movement thereof, an elongated upwardly extending threaded sleeve on one of said disks, and a non-traversing screw engaging said sleeve.

2. In a gate valve, the combination of a body or casing provided with oppositely disposed inclined seats, a valve comprising a pair of disks coöperating with said seats, the edges of said disks having spaces therebetween, guide ribs in the casing or body entering said spaces, means for connecting said disks together but permitting relative rocking movement thereof an upwardly extending threaded sleeve on one of said disks, and a screw engaging said sleeve.

3. In a gate valve, the combination of a body or casing provided with oppositely disposed inclined seats, a valve comprising a pair of disks coöperating with said seats, the edges of said disks having spaces therebetween, guide ribs in the casing or body entering said spaces, means connecting said disks together but permitting relative movement thereof, a bearing or spacing piece disposed centrally between said disks, and a screw arranged radially of said disks and adapted to raise and lower the same.

In testimony whereof, I the said LEWIS D. CASTLE have hereunto set my hand.

LEWIS D. CASTLE.

Witnesses:
FRANK H. MERZ,
SENEY A. DECKER.